Patented Jan. 10, 1950

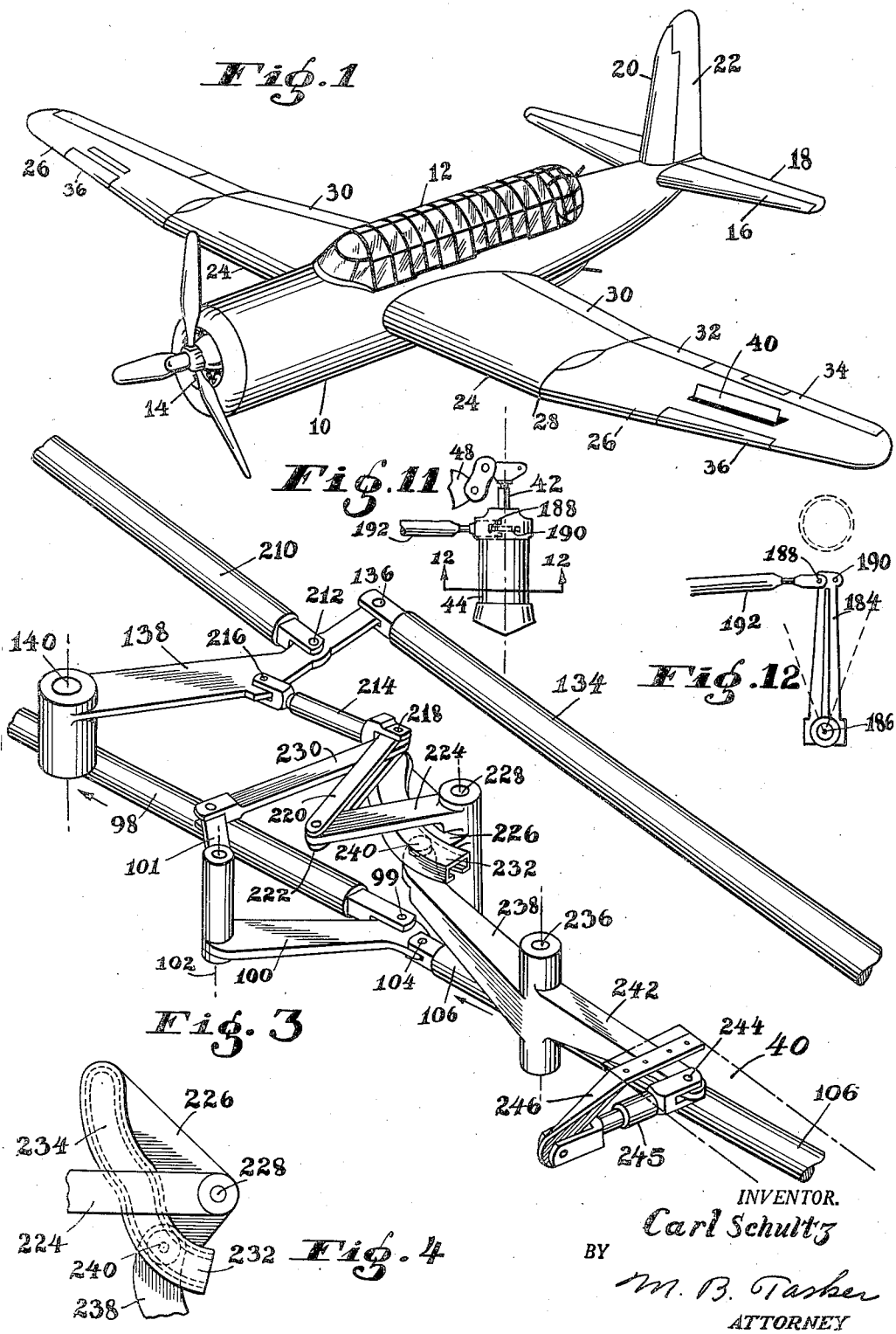

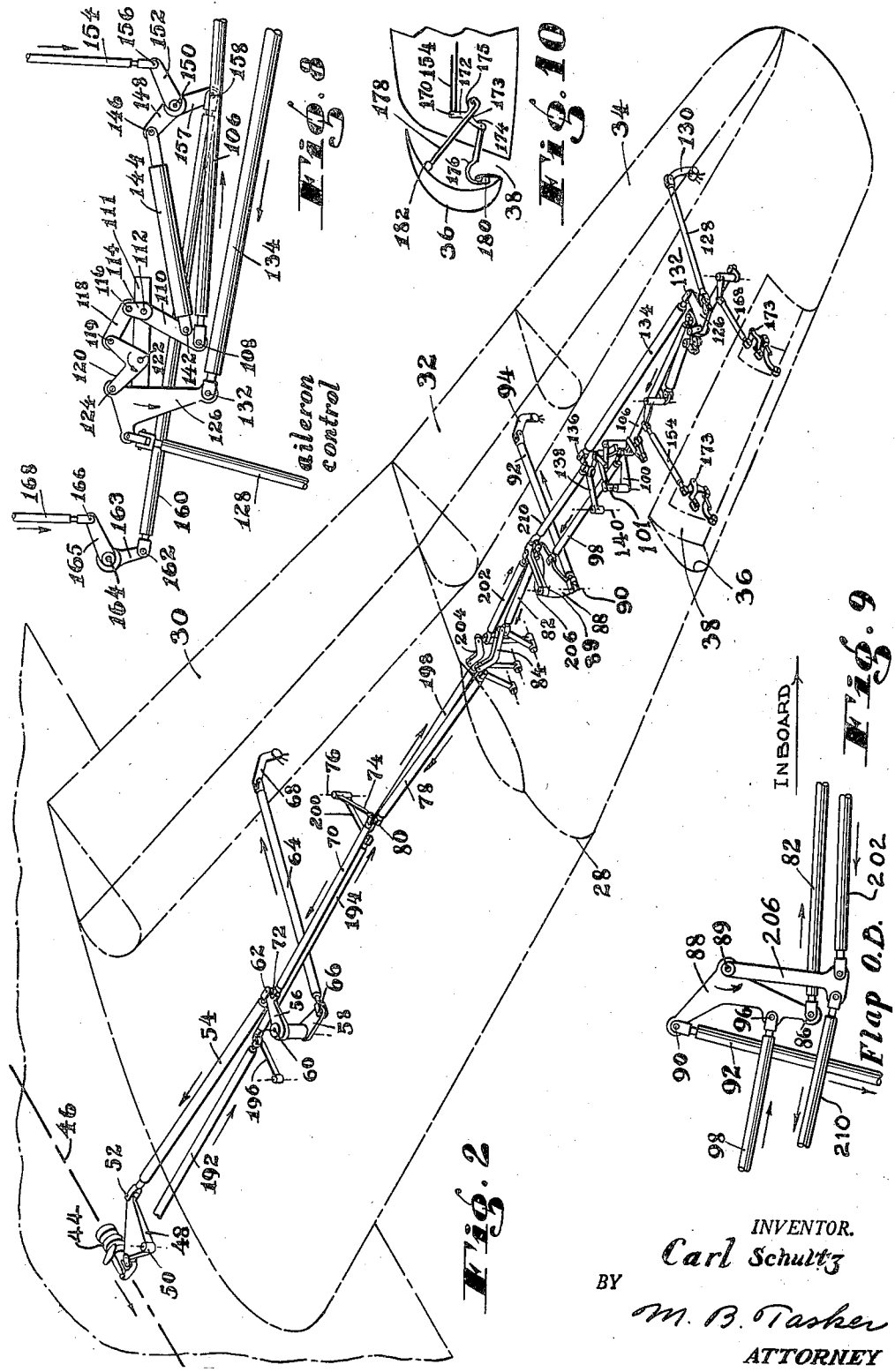

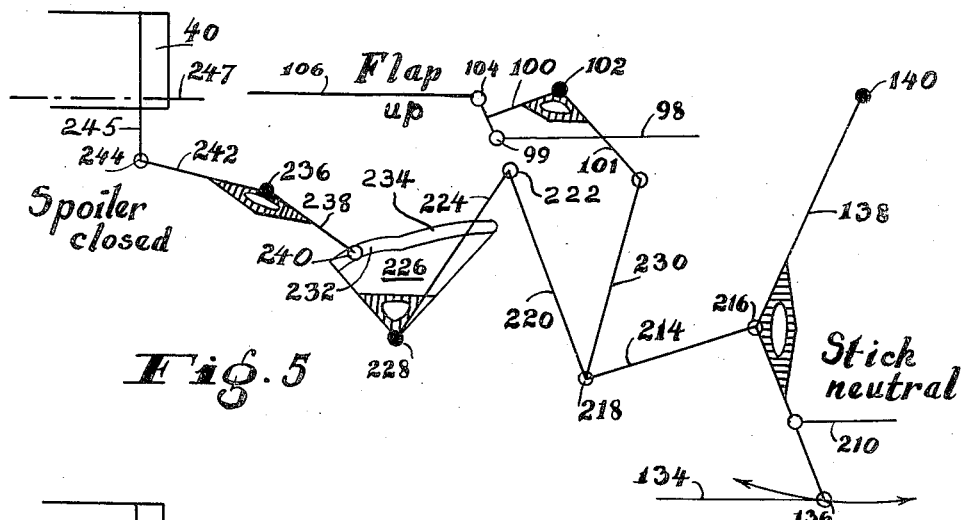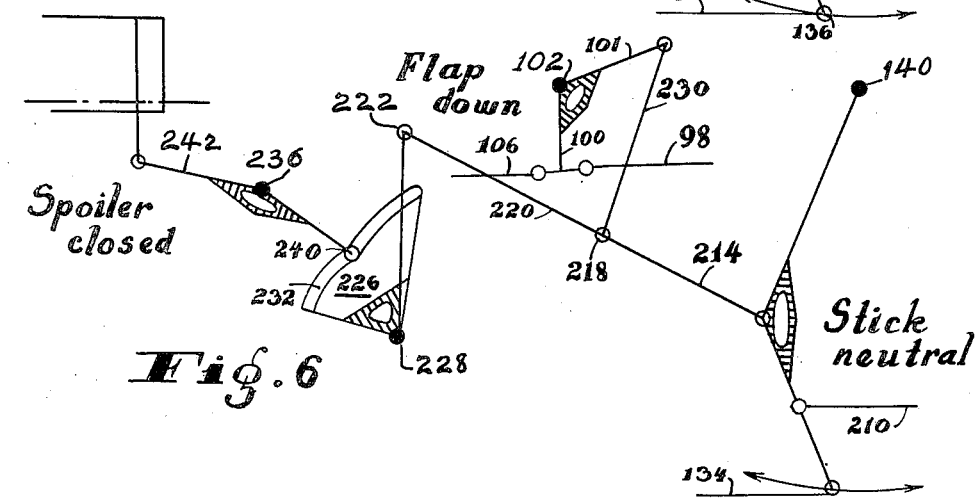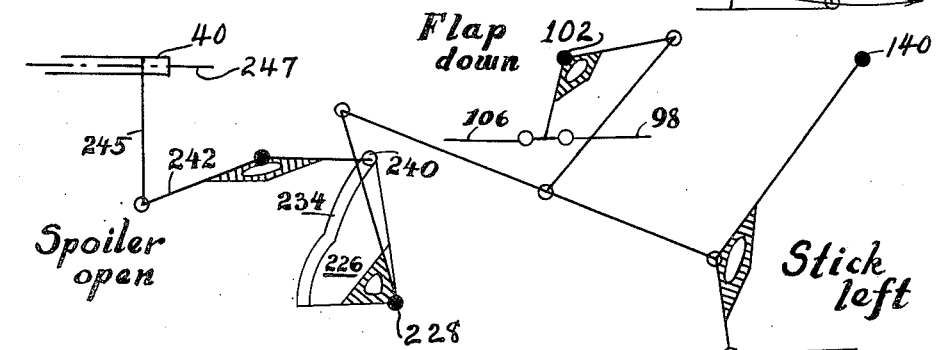

2,494,208

UNITED STATES PATENT OFFICE 2,494,208

SURFACE CONTROL SYSTEM

Carl Schultz, Milford, Conn., assignor to United Aircraft Corporation, East Hartford, Conn., a corporation of Delaware Application May 22, 1945, Serial No. 595,136

12 Claims. (Cl. 244—90)

This invention relates to improvements in control mechanism for aircraft, and has for an object the provision of improved means for controlling the operation of a plurality of flight control devices on an aircraft from a common actuating means.

Another object of the invention is the provision in an airplane having a plurality of control devices including ailerons, of operating means for controlling the simultaneous operation of said devices including the drooping of said ailerons by a common actuating member while permitting the differential operation of the ailerons with respect to a neutral position for providing lateral control of the airplane in all conditions of operation of said control devices.

More specifically it is an object of the present invention to provide a common actuating means for a surface control system which lowers the flaps, droops the ailerons, opens lift increasing slots and controls the movement of stick operated lift spoilers.

A further object of the invention is to provide a surface control system as above outlined in which lateral control of the airplane from the pilot operated stick is obtained by means of ailerons and additionally when the flaps are down by lift spoilers.

A still further object of the invention is the provision, in a control system of the above type, of interlocking means between the spoiler operating mechanism and the mechanism for operating the rest of the system for preventing operation of a spoiler by the stick except when the common actuating member has been moved to lower the flaps.

A yet further object of the invention is the provision of an improved lift spoiler operating mechanism.

A further object is generally to improve airplane control devices and operating means therefor.

Other objects and advantages of the invention will be pointed out hereinafter or will be apparent from the following description of a preferred embodiment thereof in connection with the accompanying drawings.

In these drawings,

Fig. 1 is an isometric view of an airplane embodying the invention;

Fig. 2 is a view showing the operating mechanism for the several control surfaces on the left-hand wing of the airplane of Fig. 1, the fuselage and wing of the airplane being shown in dot and dash lines;

Fig. 3 is an isometric view of the lift spoiler operating mechanism on an enlarged scale;

Fig. 4 is an enlarged detail view of a cam member of the mechanism of Fig. 3;

Figs. 5, 6 and 7 are diagrammatic views showing different positions of the spoiler operating mechanism and certain elements of the flap operating mechanism which control the operation of the spoiler;

Fig. 8 is an enlarged view of the slat operating mechanism and part of the aileron operating mechanism;

Fig. 9 is an enlarged detail of the outboard flap operating linkage;

Fig. 10 is a detail showing the differential bellcrank operating mechanism for the slats;

Fig. 11 is an enlarged view showing the hydraulic actuating mechanism for the several control devices; and Fig. 12 is a detailed view taken on line 12—12 of Fig. 11 of the stick controlled member for operating the ailerons differentially in all positions thereof and for also operating the spoilers differentially whenever the flaps are down.

Referring to Fig. 1, 10 indicates the fuselage of the airplane having the usual pilot compartment 12 and power plant 14. A usual tail assembly is provided including horizontal stabilizers 16, elevators 18, vertical fin 20 and rudder 22. The wings are of the folding panel type and each comprises a center section 24 which is rigidly secured to the fuselage and an outer panel 26 which is foldable by usual hydraulically operated mechanism about a hinge line 28 into a position overlying the center section.

Each wing is provided with several surface control devices for the longitudinal and lateral control of the airplane. To this end each of the center sections 24 is provided at its trailing edge with an inboard flap 30 which extends from the fuselage 10 to the hinge line 28. The outer wing panels 26 are also provided with short flaps 32, which are extensions of flaps 30, and are also provided outboard of the flaps 32 with trailing edge ailerons 34 which extend substantially to the tips of the wings. It will be noted that the flaps 30, 32 and aileron 34 provide continuous trailing edge control surfaces from the fuselage to a point adjacent the wing tip.

Each wing is further provided with a slat 36 substantially midway of the length of the outer wing panel which when operated provides a lift increasing slot 38 at the leading edge of the wing. Also the outer panel of each wing is provided with a lift spoiler 40 which is located substantially midway of the cord length of the wing between the slot 38 and the aileron 34.

From the above description of Fig. 1 it will be evident that the control devices of the two wings are symmetrical with respect to the longitudinal center line of the airplane. Accordingly a specific description of the control devices and the operating mechanisms associated with the one wing will suffice, and for the purposes of this description the control surfaces and operating mechanisms of the left-hand wing have been shown, reference being had particularly to Fig. 2.

Means are provided in accordance with this invention for simultaneously lowering the flaps 30 and 32, drooping the ailerons 34 and moving the slats 36 to open slots 38. The operating force for accomplishing these movements is provided by a hydraulic strut 42 (Fig. 11) which is moved in a fore and aft direction by hydraulic fluid in cylinder 44 in a usual manner, this cylinder and strut being located in the longitudinal center line 46 of the airplane, as shown in Fig. 2. Motion of the hydraulic strut 42 in a forward direction imparts motion to the idler 48 about pivot point 50 in a counterclockwise direction as viewed in Fig. 2. Motion of point 52 of idler 48 imparts movement to link 54 in an inboard direction, which causes the bell crank made up of arms 56 and 58 to move in a counterclockwise direction (Fig. 2) about its pivot point 60 by reason of the pivotal attachment of arm 56 to link 54 at 62. As the arm 58 rotates in a counterclockwise direction about its pivot 60 it imparts motion in an aft direction to a push rod 64 by reason of the pivotal connection of this rod to arm 58 at point 66. This motion of push rod 64 actuates a conventional flap horn 68, thus lowering the inboard portion 30 of the flap. At the same time that flap portion 30 is being actuated by push rod 64 movement is also imparted to drag link 70 by reason of its pivotal connection to arm 56 at 72. The drag link 70 causes the member 74 to be moved clockwise (Fig. 2) about its pivot 76 which causes the drag link 78, by reason of its pivotal connection at 80 to the member 74, to be moved in an inboard direction. Movement of link 78 imparts similar motion to the member 82 through the intermediate member 84 and its supporting linkage. This linkage is a conventional one for transmitting motion from the fixed center section of the wing to the outer panel in a foldable wing airplane and in itself forms no part of the present invention.

By movement of link 82 in the inboard direction motion is imparted at 86 to bell crank 88 in a counterclockwise direction (Fig. 9) about pivot 89 which causes motion to be imparted at 90 to push rod 92 in an aft direction, thus actuating the flap horn 94 of the outer wing panel and causing the outboard flap portion 32 to be lowered. This happens simultaneously with the lowering of the inboard portion 30 of the flap so that these two flap portions are in effect a single flap.

As bell crank 88 pivots about point 89, inboard motion is imparted at pivot point 96 to drag link 98 the outboard end of which is pivoted at 99 to a bell crank comprising arms 100 and 101, causing the latter to rotate counterclockwise about its pivot point 102 (Fig. 3) as the bell crank 88 rotates counterclockwise. Arm 100 which is pivoted at 104 to a drag link 106 causes the latter to move inboard. Drag link 106 is pivoted at 108 (Fig. 8) to arm 110 of a bell crank pivotally supported on a fixed portion 111 of the wing at point 112. The other and shorter arm 114 of this bell crank is pivoted at 116 to a link 118 which imparts counterclockwise movement at 119 to a bell crank 120 pivotally supported on 111 at a point 122. The free arm of bell crank 120 is pivoted at point 124 to a triangular member 126 which is displaced bodily in an aft direction by the counterclockwise rotation of bell crank 120 as viewed in Fig. 8. This movement is transmitted to the push rod 128 causing the aileron horn 130 to be actuated to droop the aileron 34 simultaneously with the lowering of flaps 30 and 32.

The triangular member 126 is pivotally connected at its third corner 132 to a link 134 of the aileron operating linkage, hereinafter described, which is pivotally supported at its inboard end at a point 136 (Figs. 2 and 3) on an arm 138 pivotally supported at 140. Thus as member 126 is bodily displaced by motion applied at point 124, the outboard end 132 of link 134 is angularly displaced about its pivot 136. However, since the radius of movement of point 132 about its pivot 136 is large, no effective angular motion of triangular member 126 results about the point 132. Thus the aileron drooping linkage does not react upon the motion of the aileron itself as the latter is moved differentially with respect to neutral aileron position.

As the bell crank arm 110 is moved pivotally about the point 112 in a counterclockwise direction as viewed in Fig. 8, motion is imparted at pivot point 142 to push rod 144 which in turn is pivoted at 146 to an arm 148 of a bell crank pivoted at 150. The clockwise movement of this bell crank imparted by push rod 144 is transmitted by bell crank arm 152 to drag link 154 pivotally connected thereto at 156 and moves 154 in an aft direction. The bell crank comprising arms 148 and 152 has a third arm 157 which is pivotally connected at 158 to a tie rod 160. The rod 160 is pivoted at 162 to one arm 163 of a bell crank pivoted at 164. The other arm 165 of the bell crank is pivoted at 166 to a drag link 168 which parallels the drag link 154. The rods 154 and 168 acting in unison as a result of the counterclockwise rotation of bell crank arm 110 actuate differential bell crank mechanism which moves the slat 36 and causes the slot 38 to be opened. In Fig. 10 the differential bell crank mechanism associated with rod 154 has been shown. The forward end of rod 154 is pivoted at 170 to actuating arm 172 of a three-armed bell crank centrally pivoted at 173. The other two arms 174 and 175 of the bell crank are connected by suitable links 176 and 178 to the slat 36 at points 180 and 182 respectively. It will thus be evident that as the rod 154 is moved fore and aft the slat 36 will be moved fore and aft to open and close the slot 38.

Means are provided to keep the ailerons operative differentially with respect to a neutral axis even though they may be drooped, or angularly displaced into a new general position, and suitable linkage to accomplish this end is included in the present system of linkage which is operated by the pilot operated stick. Referring to Figs. 11 and 12 it will be noted that a member 184 which is pivotally mounted on a shaft 186 which lies along the longitudinal center line 46 of the airplane below the hydraulic cylinder 44 has its free end movable to the left or the right of this line by left and right movements of the stick. This member 184 is connected by like linkages pivoted at 188 and 190 to its free end to the ailerons 34 of the left and right wings respectively. One of these linkages, that associated with the left-hand wing, will now be described.

Movement of the stick to the left causes counterclockwise rotation of shaft 186 which causes the member 184 to move to the left as viewed in Fig. 12 imparting outboard motion to link 192 which imparts similar movement to link 194 (Fig. 2) by way of the pivoted member 196. The outboard motion of link 194 is transmitted to link 198 through the pivoted member 200, and this motion is transmitted to the link 202 in the outer panel through the connecting linkage 204 and its associated supporting linkage which is a conventional linkage system for transmitting motion through the wing hinge of folding wing aircraft. As the link 202 moves in an outboard direction the member 206 moves about its pivot 89 and transmits movement to the link 210 which is pivoted at its outboard end at 212 (Fig. 3) to member 138 pivoted at 140. The free end of member 138 as previously described, is pivotally connected to the link 134 at 136 and by link 134 with the aileron operating linkage comprising the triangular member 126. During this movement of the stick to the left member 126 moves clockwise (Fig. 8) about the point 124 as a pivot to actuate rod 128 forward and, through aileron operating horn 130, raise the aileron.

The operating mechanism for the lift spoilers 40 remains to be described. The lift spoiler 40 of the left-hand wing is operated by the aileron operating mechanism above described which is responsive to lateral movements of the stick on the left side of the neutral position of the latter. The spoiler 40 of the right-hand wing is operated by similar mechanism which is responsive to movement of the stick to the right side of its neutral position. A spoiler is raised however by movement of the stick to the left or to the right only when the flaps 30 and 32 are down; otherwise lateral movement of the stick results in aileron operation only. For the purpose of describing the control of the spoilers the linkage associated with the left-hand wing will again be referred to. The mechanism for accomplishing this limited operation of the spoiler is shown most clearly in Fig. 3 and is diagrammatically illustrated in Figs. 5 to 7.

The control mechanism for the spoiler 40 of the left-hand wing comprises a link 214 pivotally connected to the member 138 at 216. The link 214 is pivotally connected at 218 with a link 220, the other end of which is pivoted at 222 to an arm 224 rigidly secured to a cam member 226 pivoted at 228. The links 214 and 220 comprise a toggle of which 218 comprises the common pivot point, or toggle joint. The point 218 is pivotally connected by a link 230 to the free end of the arm 101 of the flap control linkage for the purpose of controlling the straightening or breaking of the toggle by the operation of the flap control linkage, as will be hereinafter explained more fully.

The cam member 226 has a cam track of generally rectangular cross-section comprising an arcuate portion 232 struck about a radius having its center at point 228 and a communicating cam track portion 234 which is designed to give the proper movement to the spoiler operating linkage when a suitable cam follower associated with the spoiler operating linkage is caused to move along this portion of the track upon movement of the cam member about its pivot 228. The spoiler operating linkage comprises a bell crank pivoted at 236 one arm 238 of which carries a roller 240 comprising the cam follower and the other arm 242 of which is pivotally connected at 244 to a spoiler operating horn 246 (Fig. 3) which causes the spoiler 40 to pivot about its hinge line 247 (Fig. 5).

The operation of control linkage for lowering the flap, drooping the ailerons and opening the slots will, it is believed, be clear from the above description of these linkages. Also the control linkage for operating the ailerons differentially from the stick will, it is believed, also be clear from the above description. The operation of the spoiler mechanism and its relation to the flap operating linkage and the aileron operating linkage will now be described more in detail, reference being had to Figs. 3, 5, 6 and 7.

In the flap-up position of the control linkage shown in Figs. 3 and 5 the roller 240 is disposed in the left-hand end of the arcuate cam track 232 and the spoiler is in its normally closed, or lowered, position. It will be evident that movement of the stick from the neutral position of the parts shown in Fig. 5 to either the right or the left will merely result in the movement of the toggle joint 218 of the broken toggle without effecting movement of the cam member 226, and the spoiler will remain closed. As the hydraulic strut 42 is operated to lower the flaps, the inboard movement of rod 98 acting on arm 100 causes the bell crank comprising arms 100 and 101 to rotate counterclockwise from the position shown in Fig. 5 to the position shown in Fig. 6, this movement through the action of toggle control link 230 causing the toggles 214 and 220 to be moved to a straightened position. The straightening of toggle also causes the arm 224 to rotate the cam member 226 counterclockwise into the Fig. 6 position wherein the roller 240 has traveled to the other end of the cam slot 232. It should be noted, however, that this movement of the roller in the cam slot 232 has no effect on the spoiler operating bell crank since the arcuate cam track 232 is struck about the pivot point 228 of cam member 226.

It will be evident that in this straightened position of the toggle shown in Fig. 6 movement of the stick to the left of its neutral position will cause a further angular displacement of the cam member 226 about its pivot 228 into the position shown in Fig. 7. It will be noted that when the cam member 226 moves from the Fig. 6 position to the Fig. 7 position the roller 240 is forced to move along the non-arcuate portion 234 of the cam track which is so shaped as to impart a counterclockwise rotation to the spoiler operating bell crank, during which movement the arm 242 of this bell crank moves aft and through the link 245 moves the spoiler horn 246 (Fig. 3) to open, or raise, the spoiler.

It will thus be evident that only when the flaps are down can either spoiler be operated into its raised position by movement of the stick. It will also be evident that when the flaps are down movement of the stick to the left, for example, not only differentially operates the ailerons but also raises the left-hand spoiler to give lateral control to the plane under this condition in which, due to the drooped condition of the ailerons, the additional lateral control afforded by the spoiler is desirable.

From the above description it will be clear that when the flaps are up movement of the stick either to the right or to the left will operate the ailerons differentially but will not cause either spoiler to be raised due to the fact that the toggle comprising links 214 and 220 is broken.

In the flap down position of the mechanism shown in Fig. 6 movement of the stick to the left will raise the left-hand spoiler but will have no effect on the right-hand spoiler, since the roller 240 of the right-hand spoiler under these conditions will occupy a position corresponding to that shown in Fig. 6 and in which the cam member 226 of this right-hand spoiler mechanism can be moved counterclockwise without movement of the right-hand spoiler. This will be clear by considering what would happen if the stick were moved to the right in Fig. 6 in which case the cam member 226 of the left-hand spoiler operating mechanism would rotate clockwise and the roller 240 being in the arcuate portion 232 of the cam track would remain stationary.

In the event that the flap control mechanism should be operated to raise the flaps with the stick in either the left or right position, in which one of the spoilers is raised, it will be evident that the resulting breaking of the toggle by link 230 will cause a partial rotation of the cam member 226 in a clockwise direction from the position shown in Fig. 7 sufficient to cause the roller 240 to be moved into the spoiler closed position, the roller then occupying a position relative to the cam track shown in Fig. 6 in which it is at one end of the arcuate cam track 232. Movement of the stick to neutral position would result in a further clockwise movement of cam member 226 into the Fig. 5 position.

It will be evident that as a result of this invention means have been provided for simultaneously operating a plurality of surface control devices in an improved manner from a common pilot actuated member. More specifically means have been provided for lowering the flaps, drooping the ailerons, and moving slats to open lift increasing slots by the actuation of a single pilot operated member. Also means have been provided for the differential operation of the ailerons by the stick independently of the like operation of the ailerons by this control mechanism. It will further be evident that as a result of this invention means have been provided for additionally operating lift spoilers by the stick under certain conditions of operation of the surface control mechanism, whereby the stick can be operated laterally on either side of its neutral position irrespective of the position of the control mechanism to control the differential operation of the ailerons while movement of this mechanism to flap down position automatically conditions the spoiler operating mechanisms for selective operation by the stick.

While a preferred embodiment of the invention has been illustrated and described herein, it is to be understood that the invention is not limited to the precise details of construction, combination and arangement of elements as herein illustrated, but that the invention covers all such variations of the same as come within the scope of the following claims.

Having thus described the invention, what is claimed as new is:

1. In an airplane having a control member, a wing having a flap, a slot, an aileron, and a lift spoiler, spoiler operating mechanism for raising said spoiler by lateral movement of said member, and a single operating element for simultaneously lowering said flap, dropping said aileron and opening said slot, and means controlled by said operating element and having operative connections to said spoiler operating mechanism and said element for conditioning said spoiler operating mechanism for operation by said member.

2. In an airplane having a control member, a plurality of lift increasing devices including a flap, an aileron, and a slot, a lift spoiler, spoiler operating mechanism including linkage for raising said spoiler by lateral movement of said member, operating mechanism including a single pilot controlled operating element for simultaneously lowering said flap, drooping said aileron and opening said slot, means controlled by said operating element and having operative connections to said linkage and said element for conditioning said spoiler operating mechanism for operation by said member, and aileron operating mechanism for differentially operating said aileron by lateral movements of the member.

3. In an airplane having a surface control member, a wing having an aileron, a flap, and a slot, a slat normally closing said slot, a lift spoiler, a single control element for simultaneously lowering said flap, drooping said aileron and moving said slat to open said slot, aileron operating mechanism for adjusting said aileron up or down by lateral movements of said member in all positions of adjustment thereof by said control element, spoiler operating mechanism including linkage for raising said spoiler in response to lateral movements of said member, and means having operative connections to said linkage and said element and governed by the operation of said control element to lower said flap for conditioning said spoiler operating mechanism for operation to raise said spoiler only when said flap is lowered.

4. In an airplane having wings, a plurality of lift increasing devices on said wings, ailerons and lift spoilers for obtaining lateral control, a pilot operated member for adjusting said ailerons and spoilers, normally inoperative operating mechanism for said lift spoilers for operating the same selectively by lateral movements of said member, operating mechanism for said ailerons for operating the same differentially by the operation of said member, a single operating element for simultaneously operating all of said lift increasing devices, and means including operative connections to said element and to said spoiler operating mechanism for conditioning said spoiler operating mechanism for operation by said member.

5. In an airplane having wings, a plurality of lift increasing devices on said wings, ailerons and lift spoilers for obtaining lateral control, a pilot operated member for adjusting said ailerons and spoilers, normally inoperative operating mechanism for said lift spoilers for operating the same selectively by lateral movements of said member including a thrust toggle, operating mechanism for said ailerons for operating the same differentially by the operation of said member, a single operating element for simultaneously operating all of said lift increasing devices also having an operative connection to said ailerons for simultaneously drooping the latter to increase the lift of said wing, and means operatively connected to said element for straightening said toggle and conditioning said spoiler operating mechanism for operation by said member including operative connections to said toggle and said spoiler operating mechanism responsive to the lift increasing operation of said element.

6. In an airplane having wings, a plurality of lift increasing devices associated with said wings including flaps, ailerons and lift spoilers on said wings for obtaining lateral control, a single operating element for simultaneously operating said lift increasing devices, a pilot operated member having operating connections to said ailerons for operating the latter differentially by lateral movements of said member, said member also having operative connections to said spoilers for operating said spoilers selectively by lateral movements of said member in opposite directions when said lift increasing devices have been operated to increase the lift of said wings, and means for disabling said operating connection between said member and said spoilers in response to operation of said element including operative connections to said element and said operating connection.

7. In an airplane, a plurality of lift increasing devices, ailerons and lift spoilers for obtaining lateral control, mechanism including a single operating element for operating all of said lift increasing devices and also having an operative connection to said ailerons for simultaneously drooping the latter, mechanism including a pilot operated member for effecting differential operation of said ailerons and spoilers, and means including an operative connection between said mechanisms and controlled by said first mentioned mechanism for conditioning said second mentioned mechanism for operation of said spoilers only when said first mentioned mechanism has been operated to operate said lift increasing devices.

8. In an airplane having a wing, a flap, operating mechanism for lowering said flap, a lift spoiler, normally inoperative operating mechanism for raising said spoiler including a pilot operated member, and means including an operative connection between said operating mechanisms for conditioning said spoiler operating mechanism for operation, only when said flap operating mechanism has been moved to flap down position.

9. In an airplane having a folding wing including a center section and an outer panel, a flap pivoted to the trailing edge of said center section, a second flap pivoted to the inboard portion of the trailing edge of said outer panel, an aileron pivoted to the trailing edge of said outer panel outboard of said second flap, flap operating mechanism including a single operating element for simultaneously lowering both flaps and drooping said ailerons to provide a total span lift increasing flap, a lift spoiler, spoiler operating mechanism including a pilot operated member, and means interconnecting said flap operating mechanism and said spoiler operating mechanism for disabling the latter mechanism except in the flap down position of said flap operating mechanism.

10. In an airplane having wings, a lift spoiler on each wing, operating mechanism for raising said spoilers selectively including a pilot operated member, a flap on each wing, and operating mechanism for lowering said flaps, said spoiler operating mechanism including a pivoted cam member having a cam track and operatively connected with said stick and a cam follower in said track operatively connected with said spoiler, said operative connections between said pilot operated member and said cam member comprising a thrust toggle and said cam track comprising two contiguous portions one of which is struck about the pivot for said cam member and constitutes a dwell portion and the other of which is eccentric with respect to said pivot and constitutes a spoiler actuating portion, and means interconnecting said toggle with said flap operating mechanism for straightening said toggle in the lowered position of said flaps.

11. In an airplane having wings, a lift spoiler on each wing, operating mechanism for raising said spoilers selectively including a pilot operated member, a flap on each wing, and operating mechanism for lowering said flaps, said spoiler operating mechanism including a pivoted cam member having a cam track and operatively connected with said member and a cam follower in said track operatively connected with said spoiler, said operative connections between said pilot operated member and said cam member comprising a thrust toggle and said cam track comprising two contiguous portions one of which is struck about the pivot for said cam member and constitutes a dwell portion and the other of which is eccentric with respect to said pivot and constitutes a spoiler actuating portion, and means interconnecting said flap operating mechanism with said spoiler operating mechanism for breaking said toggle and disabling said spoiler operating mechanism except when said flap operating mechanism is in flap lowered position.

12. In an airplane having a wing, a wing lift increasing device, a wing lift spoiler, operating means for said spoiler including a toggle movable between a straightened spoiler operating position and a broken position, and means for operating said lift increasing device including connections to said device and said toggle for straightening the latter whenever said device is operated to increase the lift of the wing.

CARL SCHULTZ.

REFERENCES CITED

The following references are of record in the file of this patent:

UNITED STATES PATENTS

| Number | Name | Date |
|---|---|---|
| 1,723,653 | Lybrand | Aug. 6, 1929 |
| 1,800,746 | Page | Apr. 14, 1931 |
| 1,858,259 | Alfaro | May 17, 1932 |
| 1,862,902 | McDonnell, Jr. | June 14, 1932 |
| 1,989,358 | Guthier | Jan. 29, 1935 |
| 1,992,157 | Hall | Feb. 19, 1935 |
| 2,070,006 | Eaton, Jr., et al. | Feb. 9, 1937 |
| 2,137,879 | Ksoll | Nov. 22, 1938 |
| 2,376,731 | Stoner | May 22, 1945 |
| 2,381,678 | Maxwell | Aug. 7, 1945 |